United States Patent
Patil et al.

(10) Patent No.: US 9,432,906 B2
(45) Date of Patent: Aug. 30, 2016

(54) HANDLING CONNECTED MODE MOBILITY FROM AREAS BOUNDING MULTI-OPERATOR CORE NETWORK AND NON-MULTI-OPERATOR CORE NETWORK SHARED INFRASTRUCTURE

(71) Applicant: CISCO TECHNOLOGY, INC., San Jose, CA (US)

(72) Inventors: Santosh Ramrao Patil, Bangalore (IN); Eric Hamel, Paris (FR); Mark Grayson, Maidenhead (GB); Anton Okmyanskiy, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 125 days.

(21) Appl. No.: 14/310,915

(22) Filed: Jun. 20, 2014

(65) Prior Publication Data
US 2015/0312834 A1    Oct. 29, 2015

Related U.S. Application Data (60) Provisional application No. 61/877,270, filed on Sep. 12, 2013.

(51) Int. Cl.
*H04W 36/36* (2009.01)
*H04W 36/00* (2009.01)
(Continued)

(52) U.S. Cl.
CPC ............. *H04W 36/36* (2013.01); *H04W 24/10* (2013.01); *H04W 36/0022* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 6,464,743 B2 * | 10/2002 | Kanno et al. | ................. 55/450 |
| 7,330,452 B2 | 2/2008 | Shiu et al. | |
| 7,768,983 B2 | 8/2010 | Nylander et al. | |

(Continued)

FOREIGN PATENT DOCUMENTS

| | | |
|---|---|---|
| CN | 101820608 | 9/2010 |
| EP | 2521401 | 11/2012 |

(Continued)

OTHER PUBLICATIONS

EPO Mar. 25, 2015 Extended Search Report and Written Opinion from European Application 14183969.6.

(Continued)

*Primary Examiner* — Chi H Pham
*Assistant Examiner* — Shick Hom
(74) *Attorney, Agent, or Firm* — Patent Capital Group (57) ABSTRACT

A method provided in one embodiment includes receiving, at a first network element, a first message including a first network identifier associated with a first network. The first message further includes an indication of an association of the first network identifier with a first user equipment. The method further includes receiving, by the first network element, a second message indicative of an initiated handover of the first user equipment to a second network. The second message includes a second network identifier associated with the second network. The method further includes determining, by the first network element, whether the second network identifier matches the first network identifier, and terminating the initiated handover by the first network element when the second network identifier does not match the first network identifier.

22 Claims, 9 Drawing Sheets

(51) Int. Cl.
*H04W 24/10* (2009.01)
*H04W 84/04* (2009.01)

(56) References Cited

U.S. PATENT DOCUMENTS

| | | | |
|---|---|---|---|
| 8,019,331 | B2 | 9/2011 | Khetawat et al. |
| 8,059,584 | B2 | 11/2011 | Shiu et al. |
| 8,228,861 | B1 | 7/2012 | Nix |
| 8,644,193 | B2 | 2/2014 | Schein et al. |
| 9,282,465 | B2 | 3/2016 | Grayson et al. |
| 2006/0183502 | A1 | 8/2006 | Jeong et al. |
| 2008/0305768 | A1* | 12/2008 | Nylander et al. ............ 455/410 |
| 2009/0325577 | A1 | 12/2009 | Furtenback |
| 2011/0128890 | A1 | 6/2011 | Schein et al. |
| 2011/0130144 | A1 | 6/2011 | Schein et al. |
| 2011/0235546 | A1* | 9/2011 | Horn et al. .................. 370/254 |
| 2012/0030373 | A1 | 2/2012 | Yang |
| 2012/0094665 | A1 | 4/2012 | Soliman et al. |
| 2012/0264443 | A1* | 10/2012 | Ng et al. ...................... 455/450 |
| 2013/0028119 | A1 | 1/2013 | Ben-Eli |
| 2013/0089073 | A1* | 4/2013 | Zhu .............................. 370/331 |
| 2013/0265954 | A1 | 10/2013 | Dahlen |
| 2013/0267229 | A1 | 10/2013 | Gopalakrishnan |
| 2013/0303114 | A1 | 11/2013 | Ahmad et al. |
| 2014/0031033 | A1 | 1/2014 | Juang et al. |
| 2014/0120911 | A1 | 5/2014 | Kozuka |
| 2015/0312834 | A1 | 10/2015 | Patil et al. |
| 2015/0358807 | A1 | 12/2015 | Gorey et al. |

FOREIGN PATENT DOCUMENTS

| | | |
|---|---|---|
| EP | 2863680 | 4/2015 |
| EP | 2953405 | 12/2015 |
| GB | 2510637 | 8/2014 |
| WO | WO2005/109936 | 11/2005 |
| WO | WO2013/064419 | 5/2013 |
| WO | WO2014/124813 | 8/2014 |

OTHER PUBLICATIONS

Qualcomm Incorporated: "Support of Inter PLMN Handover to CSG Cells," 3GPP Draft R2-114406, WG2 Meeting #75, Athens, Greece, Aug. 22-26, 2011; 6 pages.

U.S. Appl. No. 14/305,431, filed Jun. 16, 2014, entitled "Multi-Operator Core Network Shared Small Cell Deployment in a Non-Multi-Operator Macro Network Environment," Inventors: Mark Grayson, et al.

"3GPP TS-23.251 V10.1.0 (Mar. 2011) Technical Specification: $3^{rd}$ Generation Partnership Project; Technical Specification Group Services and System Aspects; Network Sharing; Architecture and functional description (Release 10)," $3^{rd}$ Generation Partnership Project, Mar. 2011, 25 pages.

3GPP TR-25.875 V5.0.0 (Mar. 2002) Technical Report: $3^{rd}$ Generation Partnership Project; Technical Specification Group Radio Access Network; Non Access Stratum (NAS) Node Selection Function (Release 5), $3^{rd}$ Generation Partnership Project, Mar. 2002, 12 pages.

"3GPP-TR-37.803 V11.2.0 (Jun. 2013) Technical Report: $3^{rd}$ Generation Partnership Project; Technical Specification Group Radio Access Network; Universal Mobile Telecommunications System (UMTS) and LTE; Mobility Enhancements for Home Node B (HNB) and Home enhanced Node B (HeNB) (Release 11)," $3^{rd}$ Generation Partnership Project, Mar. 2013, 116 pages.

USPTO Aug. 20, 2015 Non-Final Office Action from U.S. Appl. No. 14/305,431.

"ETSI TS-136-413 V8.10.0 (Jun. 2010) Technical Specification: LTE; Evolved Universal Terrestrial Radio Access Network (E-UTRAN); S1 Application Protocol (S1AP) (3GPP TS 36.413 version 8.10.0 Release 8);" © European Telecommunication Standards Institute 2010; Jun. 2010, 220 pages.

"ETSI TS-124-008 V8.19.0 (Jul. 2013) Technical Specification: Digital cellular telecommunications system (Phase 2+); Universal Mobile Telecommunications System (UMTS); LTE; Mobile radio interface Layer 3 specification; Core network protocols; Stage 3 (3GPP TS 24.008 version 8.19.0 Release 8);" © European Telecommunication Standards Institute 2013; Jul. 2013; 594 pages.

"ETSI TS-123-251 V9.4.0 (Mar. 2011) Technical Specification: Universal Mobile Telecommunications System (UMTS); LTE; Network Sharing; Architecture and functional description (3GPP TS 23.251 version 9.4.0 Release 9);" © European Telecommunication Standards Institute 2011; Mar. 2011; 22 pages.

"ETSI TS-123-401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9);" © European Telecommunication Standards Institute 2010; May 2010; 261 pages.

"ETSI TS-125-331 V9.16.0 (Oct. 2013) Technical Specification: Universal Mobile Telecommunications System *UMTS); Radio Resource Control (RRC); Protocol specification (3GPP TS 25.331 version 9.16.0 Release 9);" ©European Telecommunication Standards Institute 2013; Oct. 2013; pp. 679-698.

EPO Oct. 27, 2015 Search Report and Written Opinion from European Application Serial No. EP15170901.

"Draft 3GPP TS 23.251 V12.1.0 (Apr. 2014) Technical Specification: Group Services and System Aspects; Network Sharing; Architecture and Functional Description (Release 12);" $3^{rd}$ Generation Partnership Project, Interim_Draft_23251-C10, 650 Route Des Lucioles, F-06921 Sophia-Antipolis Cedex, France; Apr. 201; 35 pages.

* cited by examiner

HANDLING CONNECTED MODE MOBILITY FROM AREAS BOUNDING MULTI-OPERATOR CORE NETWORK AND NON-MULTI-OPERATOR CORE NETWORK SHARED INFRASTRUCTURE

CROSS-REFERENCE TO RELATED APPLICATION

This application claims the benefit of priority under 35 U.S.C. §119(e) to U.S. Provisional Application Ser. No. 61/877,270, entitled "HANDLING CONNECTED MODE MOBILITY FROM AREAS BOUNDING MOCN AND NON-MOCN SHARED INFRASTRUCTURE" filed Sep. 12, 2013, which is hereby incorporated by reference in its entirety.

TECHNICAL FIELD

This disclosure relates in general to the field of communications and, more particularly, to handling connected mode mobility from areas bounding multi-operator core network and non-multi-operator core network shared infrastructure.

BACKGROUND

Networking architectures have grown increasingly complex in communication environments. For example, femtocells have gained recent notoriety due to their capabilities, and because of their ease-of-use. In general terms, access points can operate in licensed spectrum to connect wireless devices to the network (e.g., using broadband connections). For a mobile operator, the access points can offer improvements to both coverage and capacity: particularly applicable to indoor environments. An increasing emphasis exists on deploying small cell access points within such environments. The owner or manager of these environments may mandate that multiple operators share the small cell access point in a particular environment. Existing standards are based on the assumption that the multiple operators will share radio access network (RAN) resources as well as the small cell access point. However, the multiple operators may not wish to share RAN resources among one another.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EXAMPLE EMBODIMENTS

Overview

A method is provided in one embodiment and includes receiving, at a first network element, a first message including a first network identifier associated with a first network. The first message further includes an indication of an association of the first network identifier with a first user equipment. The method further includes receiving, by the first network element, a second message indicative of an initiated handover of the first user equipment to a second network. The second message includes a second network identifier associated with the second network. The method further includes determining, by the first network element, whether the second network identifier matches the first network identifier, and terminating the initiated handover by the first network element when the second network identifier does not match the first network identifier.

In specific embodiments, the method further includes allowing the initiated handover when the second network identifier matches the first network identifier. In other specific embodiments, the initiated handover is an initiated handover of the first user equipment from a third network to the second network. In other specific embodiments, the third network is a small cell network. In still other specific embodiments, the first network element comprises a small cell access point.

In other specific embodiments, the second message is a measurement report from the first user equipment. In still other specific embodiments, the first network is a first core network associated with a first network operator and the second network is a second core network associated with a second operator. In still other specific embodiments, the first network element is a small cell gateway. In other specific embodiments, the second message is a handover message. In still other specific embodiments, the handover message is a relocation request message. In other specific embodiments, terminating the initial handover includes sending a handover failure message to a second network element. In still other specific embodiments, the second network element is a small cell access point.

Logic encoded in one or more non-transitory media is provided in one embodiment that includes code for execution and when executed by a processor operable to perform operations comprising receiving, at a first network element, a first message including a first network identifier associated with a first network. The first message further includes an indication of an association of the first network identifier with a first user equipment. The operations further include receiving, by the first network element, a second message indicative of an initiated handover of the first user equipment to a second network. The second message includes a second network identifier associated with the second network. The operations still further include determining, by the first network element, whether the second network identifier matches the first network identifier, and terminating the initiated handover by the first network element when the second network identifier does not match the first network identifier.

A network element is provided in one embodiment and includes a memory element configured to store electronic code, a processor operable to execute instructions associated with the electronic code, and a module coupled to the memory element and the processor. The network element is configured for receiving a first message including a first network identifier associated with a first network. The first message further includes an indication of an association of the first network identifier with a first user equipment. The network element is further configured for receiving a second message indicative of an initiated handover of the first user equipment to a second network. The second message includes a second network identifier associated with the second network. The network element is further configured for determining whether the second network identifier matches the first network identifier, and terminating the initiated handover by the first network element when the second network identifier does not match the first network identifier.

Example Embodiments

Figure 1:
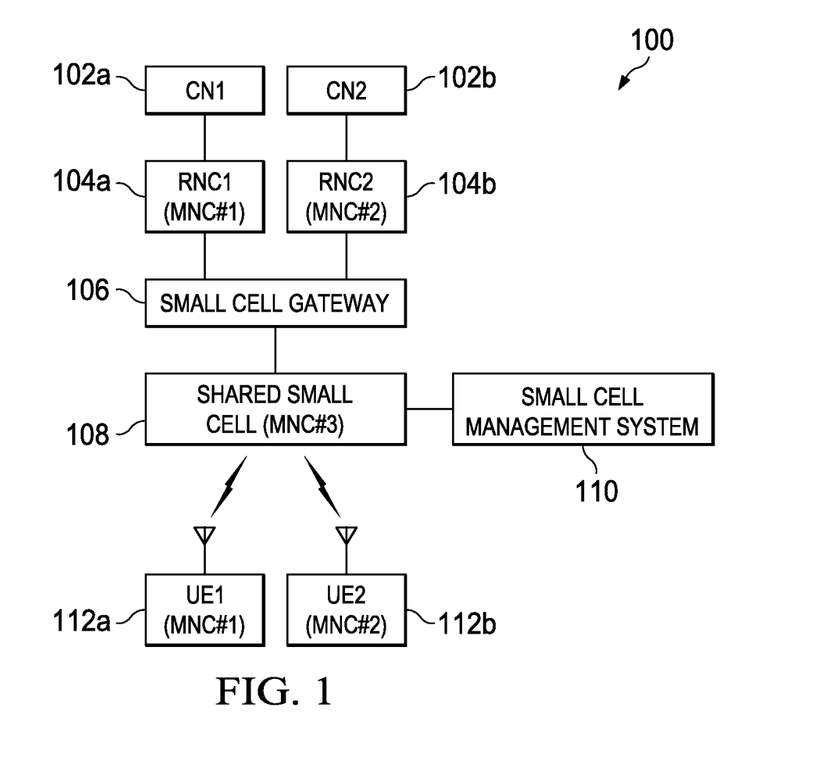
FIG. 1 is a simplified block diagram of a communication system for performing multiple operator network shared small cell deployment in a non-multiple operator macro network environment in accordance with one embodiment of the present disclosure.

Referring now to FIG. 1, FIG. 1 is a simplified block diagram of a communication system 100 for performing multiple operator network shared small cell deployment in a non-multiple operator macro network environment in accordance with one embodiment of the present disclosure. Communication system 100 includes a first core network (CN1) 102a, a second core network (CN2) 102b, a first radio network controller (RNC 1) 104a, a second RNC (RNC 2) 104b, a small cell gateway 106, a shared small cell 108, a shared small cell management system 110, a first user equipment 112a, and a second user equipment 112b.

First core network 102a is in communication with first RNC 104a and second core network 102b is in communication with second RNC 104b. Each of first RNC 104a and second RNC 104b are in further communication with small cell gateway 106. Small cell gateway 106 is further in communication with shared small cell 108 of a small cell network. Small cell management system 110 is in communication with shared small cell 108. Each of first user equipment (UE) 112a and second user equipment (UE) 112b are in wireless communication with shared small cell 108.

First core network 102a and second core network 102b are each mobile core macro cell networks that are operated by a first operator and second operator, respectively. In the particular embodiment illustrated in FIG. 1, the first operator and second operator do not have an existing agreement to share RAN resources among one another. Accordingly, first RNC 104a is associated with first core network 102a and is operated by the first operator, and second RNC 104b is associated with second core network 102b and is operated by the second operator. Small cell gateway 106 functions as a gateway between the core network (such as one or more of first core network 102a and second core network 102b) and one or more small cells within a small cell network environment (such as shared small cell 108). In the embodiment illustrated in FIG. 1, shared small cell 108 is shared by first core network 102a and second core network 102b.

Shared small cell 108 further provides first UE 112a and second UE 112b with access to one or more of first core network 102a and second core network 102b. In a particular embodiment, shared small cell 108 is a small cell access point located at or within a small cell environment such as a commercial building or other premises. In particular embodiments, shared small cell 108 is a femtocell access point. In still another particular embodiment, shared small cell is a Home Node B (HNB) femtocell providing 3G radio coverage within the small cell environment. Small cell management system 110 is configured to manage various functions, services, and resources provided by shared small cell 108.

Each of first RNC 104a, second RNC 104b, and shared small cell 108 has an associated network identifier such as a public land mobile network (PLMN) identifier including a mobile network code (MNC). In the particular embodiment illustrated in FIG. 1, first RNC 104a has an associated PLMN of MNC#1, second RNC 104b has an associated PLMN of MNC#2, and shared small cell gateway has an associated PLMN of MNC#3.

Each of first UE 112a and second UE 112b is configured to include a cellular radio capable of communicating with small cell access points located within a small cell environment as well as macro cells located within an service provider network. Each of first UE 112a and second UE 112b may be associated with clients or customers wishing to initiate a communication in communication system 100 via some network. The term 'user equipment' is interchangeable with the terminology 'endpoint' and 'wireless device', where such terms are inclusive of devices used to initiate a communication, such as a computer, a personal digital assistant (PDA), a laptop or electronic notebook, a cellular telephone, an i-Phone, an i-Pad, a Google Droid, an IP phone, or any other device, component, element, or object capable of initiating voice, audio, video, media, or data exchanges within communication system 100.

Each of first UE 112a and second UE 112b may also be inclusive of a suitable interface to the human user, such as a microphone, a display, a keyboard, or other terminal equipment. Each of first UE 112a and second UE 112b may also be any device that seeks to initiate a communication on behalf of another entity or element, such as a program, a database, or any other component, device, element, or object capable of initiating an exchange within communication system 100. Data, as used herein in this document, refers to any type of numeric, voice, video, or script data, or any type of source or object code, or any other suitable information in any appropriate format that may be communicated from one point to another.

Note that before detailing some of the operational aspects of FIG. 1, it is important to understand common characteristics of radio access points, femtocells, etc. as they generally operate in commercial architectures. The following foundational information is offered earnestly for purposes of teaching and example only and, therefore, should not be construed in any way to limit the broad teachings of the present disclosure. In many architectures, femtocells can be deployed as autonomous units to improve reception in areas with poor coverage, or within buildings where coverage is reduced by the structure itself. Wireless devices that are attached to (and in communication with) femtocells can have their data transmissions routed to the service provider's network (e.g., over the internet, over any suitable network, etc.). Thus, the access point (e.g., the femtocell) operates as a mini tower for the proximate user. However, the coverage provided by the access point is generally open to anyone within range: unless configurations operate to limit access to the network to only those individuals duly authorized for access.

Essentially, femtocells are fully featured (but low-power) wireless device base stations. Femtocells can be connected using standard broadband digital subscriber line (DSL), cable service, or Enterprise Network into the service provider's network. Femtocells offer excellent wireless device coverage at home for voice, data, etc., but at a lower cost than an arbitrary outdoor service. In operation, when in range of the femtocell (e.g., in a residential environment), a wireless device can automatically detect the femtocell, and subsequently use it (as a preference over outdoor cell sites). Calls can be made and received, where the signals are sent (potentially encrypted) from the femtocell via the broadband IP network to one of the mobile operator's main switching centers. Typically, femtocells operate at low radio power levels (e.g., less than cordless phones, WiFi, or many other household equipment). This can substantially increase battery life for wireless devices: both on standby and talk time. Additionally, because wireless devices are much closer to the femtocell, call quality is excellent and data devices can operate at full speed. Larger femtocell designs intended for business use (i.e., enterprise) can readily handle 8, 16, 32, etc. concurrent calls.

Multi-Operator Core Network (MOCN) allows network operators to share equipment and other resources, in particular RAN equipment and resources, in a particular geographic service area. 3GPP standards have defined shared Node B(NB)/eNode B (ENB)/Home Node B (HNB)/Home eNode B (HeNB)/capabilities on the presumption that the cells surrounding a MOCN enabled base station are also shared. Typically, MOCN deployments therefore see networks partitioned on a geographic basis with one operator responsible for deploying MOCN enabled macro networks in one area and a second operator deploying MOCN enabled macro networks in another geographic area. Furthermore, 3GPP requires all cells in a tracking area (TA)/routing area (RA)/location area (LA) to conform to the same MOCN status, i.e., a single cell cannot be MOCN enabled if the neighboring cells in the TA/RA/LA are not similarly shared. Accordingly, recent moves to adopt small cells is causing the assumptions of the 3GPP approach above to breakdown. Now, venue owners may mandate shared small cell infrastructure by the operators without an appreciation that the macro network is not shared between the operators. In addition, MOCN specifies that a common configuration should be deployed within one "area", e.g., LAC, RAC and/or TAC. In such cases there are corner cases to consider where a MOCN shared infrastructure neighbors non-shared infrastructure. This case has not been considered by 3GPP and is increasingly likely as there is a motivation for operators to share small cell equipment that are then deployed in a larger non-shared macro.

Referring again to FIG. 1, a MOCN small cell (such as a HNB) system is defined that is able to be integrated in a geography in which the available core network that share the small cell have not entered into a broader MOCN arrangement for their macro networks. In particular, shared small cell 108 may be MOCN enabled that is deployed by a core network operator associated with first core network 102a. However, because of restrictions placed on the deployment by the owner/manager of the premises in which shared small cell 108 is deployed, shared small cell 108 may be required to offer shared service to the second core network operator associated with second core network 102b.

A base station configured for MOCN operation will typically include a neighbor list including identifying neighbors from overlapping macro cells. In a small cell implementation, the small cell, such as an HNB, receives the equivalent PLMN list that then enables network listen results to be qualified as to which PLMN they correspond to using a protocol such as described in Broadband Forum (BBF) Technical Report TR-196v2 protocol. The base station is operable to broadcast neighbor lists corresponding to a plurality of macro networks. Various embodiments described herein relate to the deployment use case where the plurality of macro networks are NOT shared.

In the embodiment illustrated in FIG. 1, PLMNs MNC#1 associated with first RNC 104a and MNC#2 associated with second RNC 104b share shared small cell 108. In accordance with 3GPP standard 23.251, a common PLMN ID is configured on the shared infrastructure. In this case, the shared small cell 108 is configured to broadcast a PLMN ID of MNC#3. First core network 102a and second core network 102b may be configured to indicate in Non Access Stratum (NAS) signaling that MNC#3 is equivalent, e.g., first core network 102a associated with PLMN ID MNC#1 will indicate PLMN ID MNC#3 as equivalent and similarly, second core network 102b associated with MNC#2 will indicate that MNC#3 is equivalent.

The MOCN architecture includes a Non Access Stratum (NAS) Node Selection (NNSF) Function to assign specific network resources to serve a particular UE and subsequently route the traffic to the assigned network resource. The NAS Node Selection function is able to the mobile country code (MCC)/mobile network code (MNC) used to identify a particular core network from an international mobile subscriber identity (IMSI) to then determine how to route UE initiated mobility management and/or connection management dialogues. The NAS Node Selection Function is described, for example, in 3GPP TS 23.251. The NNSF is located in small cell gateway 106 (e.g., an HNB-GW) which then selects a particular core network (CN) to identify a particular UE with a particular RNC using for example, IMSI ranges. In the embodiment illustrated in FIG. 1, small cell gateway identifies first UE (UE1) 112a is identified with MNC#1 to first core network 102a, and second UE (UE#2) 112b is identified with MNC#2 to second core network 102b.

Although existing standards define idle mode mobility for MOCN deployments, they fail address connected mode mobility. In particular, existing standards do not address the case in which, for example, first UE (UE#1) 112a reports high signal quality and/or signal strength of a neighbor corresponding to the macro network (non-shared cell) of MNC#2. Since the NNSF is located in small cell gateway 106, shared small cell 108 has no knowledge of which core network is associated with a particular UE and further has no knowledge whether the target cell ID is shared or not or is equivalent to the home network of a particular UE.

One or more embodiments described herein provide for disabling of handover of first UE 112a to a target non-shared cell such as that of MNC #2. In one embodiment, UE registration response message, such as a Home Node B Application Part (HNBAP) protocol UE registration response message, is augmented with core network information identifying the PLMN-IDs selected for a UE as will be further described herein. For example, in particular embodiments, a UE registration exchange between small cell gateway 106 and shared small cell 108 is able to signal that an in-bound roaming UE has been updated on a core network of PLMN#1.

In such embodiments, functionality of shared small cell 108 may be enhanced to receive such signaling from small cell gateway 106 and to use the receive information in handover decisions. For example, a UE signaled as being updated on second core network 102b that is then reporting measurement reports from a cell belonging to first core network 102a will not trigger handover. In particular embodiments, the core network association of a target cell is derived from a PLMN-ID obtained from a network listen capability.

In another embodiment, modification of shared small cell 108 may not be necessary but instead small cell gateway 106 may be enhanced with a capability to decode Radio Access Network Application Part (RANAP) protocol messages, in a particular example a Relocation Required message (or similar handover message) and to then decode the target cell ID. The RNC-ID may be further enhanced with configuration of RNC-IDs used by overlapping non-shared networks. In one or more embodiments, the enhanced small cell gateway 106 is operable to recover the target cell ID from the relocation required message and match against the configured RNC-IDs to determine the target PLMN-ID. If there is a mismatch between the target PLMN-ID and the PLMN-ID supporting the UE in idle mode, then small cell gateway 106 may be configured to autonomously reject the relocation required message, e.g., signaling a Relocation Preparation Failure message towards the source shared small gateway 108.

Accordingly, various embodiments described herein describe systems and methods that are able to support co-located shared and non-shared networks, including supporting optimized connected mode operations. Although various embodiments are illustrated using small cells (such as HNBs) to demonstrate such capability, it should be understood that the principles described herein may be used in handover between any suitable networks. One or more embodiments may provide an advantage of enabling operators to share small cells whilst having dedicated macro cells and supporting connected mode mobility from shared to non-shared networks.

Figure 2:
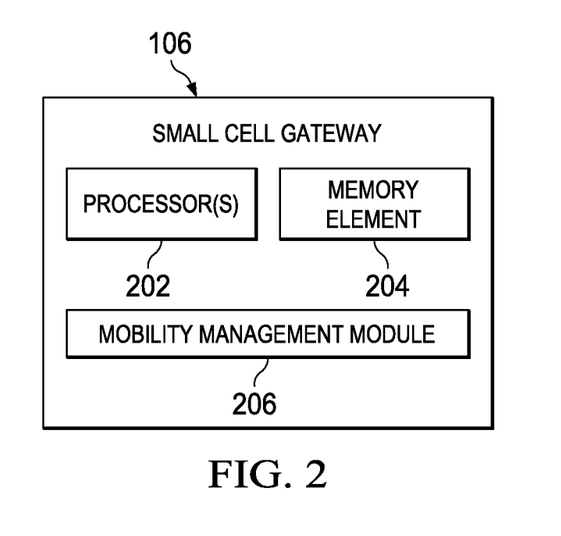
FIG. 2 is a simplified block diagram of a small cell gateway in accordance with one embodiment.

Referring now to FIG. 2, FIG. 2 is a simplified block diagram of small cell gateway 106 in accordance with one embodiment. Small cell gateway 106 includes one or more processors 202, a memory element 204, and a mobility management module 206. Processor(s) 202 is configured to execute various tasks of small cell gateway 106 as described herein and memory element 204 is configured to store data associated with small cell gateway 106. Mobility management module 206 is configured to perform the various mobility management functions of small cell gateway 106 as described herein. In particular embodiments, mobility management module 206 is configured to accept or reject relocation requests associated with a particular UE received from shared small cell 108 based upon whether a target cell identifier matches a cell identifier supporting the UE in idle mode.

Figure 3:
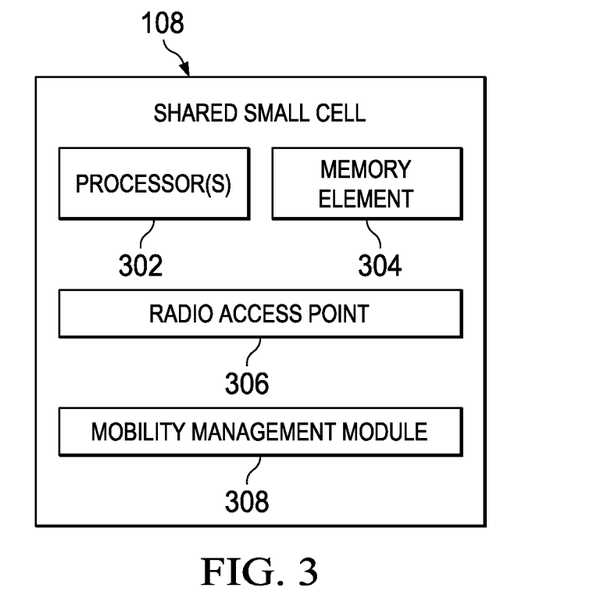
FIG. 3 is a simplified block diagram of a shared small cell in accordance with one embodiment.

Referring now to FIG. 3, FIG. 3 is a simplified block diagram of shared small cell 108 in accordance with one embodiment. Shared small cell 108 includes one or more processors 302, a memory element 304, a radio access point 306, and a mobility management module 308. Processor 302 is configured to execute various tasks of shared small cell 108 as described herein and memory element 304 is configured to store data associated with shared small cell 108. Radio access point 206 is configured to communicate using a wireless radio connection, such as a 3G or 4G connection, with one or more of first UE 112a and second UE 112b. Mobility management module 308 is configured to perform the various mobility management functions of shared small cell 108 as described herein. In a particular embodiment, mobility management module 308 is configured to receive such signaling from small cell gateway 106 and to use the receive information in handover decisions.

Figure 4:
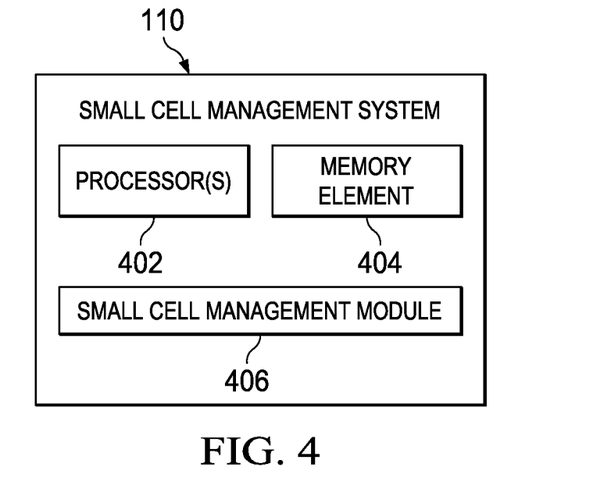
FIG. 4 is a simplified block diagram of a shared small cell management system in accordance with one embodiment.

Referring now to FIG. 4, FIG. 4 is a simplified block diagram of shared small cell management system 110 in accordance with one embodiment. Shared small cell management system 110 includes one or more processors 402, a memory element 404, and a small cell management module 406. Processor(s) 402 is configured to execute various tasks of shared small cell management system 110 as described herein and memory element 304 is configured to store data associated with shared small cell management system 110. Small cell management module 406 is configured to perform various small cell management functions of shared small cell management system 110 as described herein. In a particular embodiment, small cell management module 406 is configured to provide MOCN configuration information to shared small cell 108.

In one example implementation, small cell gateway 106, shared small cell 108 and/or shared small cell management system 110 are network elements that facilitate or otherwise help coordinate multiple operator network shared small cell activities (e.g., for networks such as those illustrated in FIG. 1). As used herein in this Specification, the term 'network element' is meant to encompass network appliances, servers, routers, switches, gateways, bridges, loadbalancers, firewalls, processors, modules, base stations, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, small cell gateway 106, shared small cell 108 and/or shared small cell management system 110 include software to achieve the operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

Figure 5A:
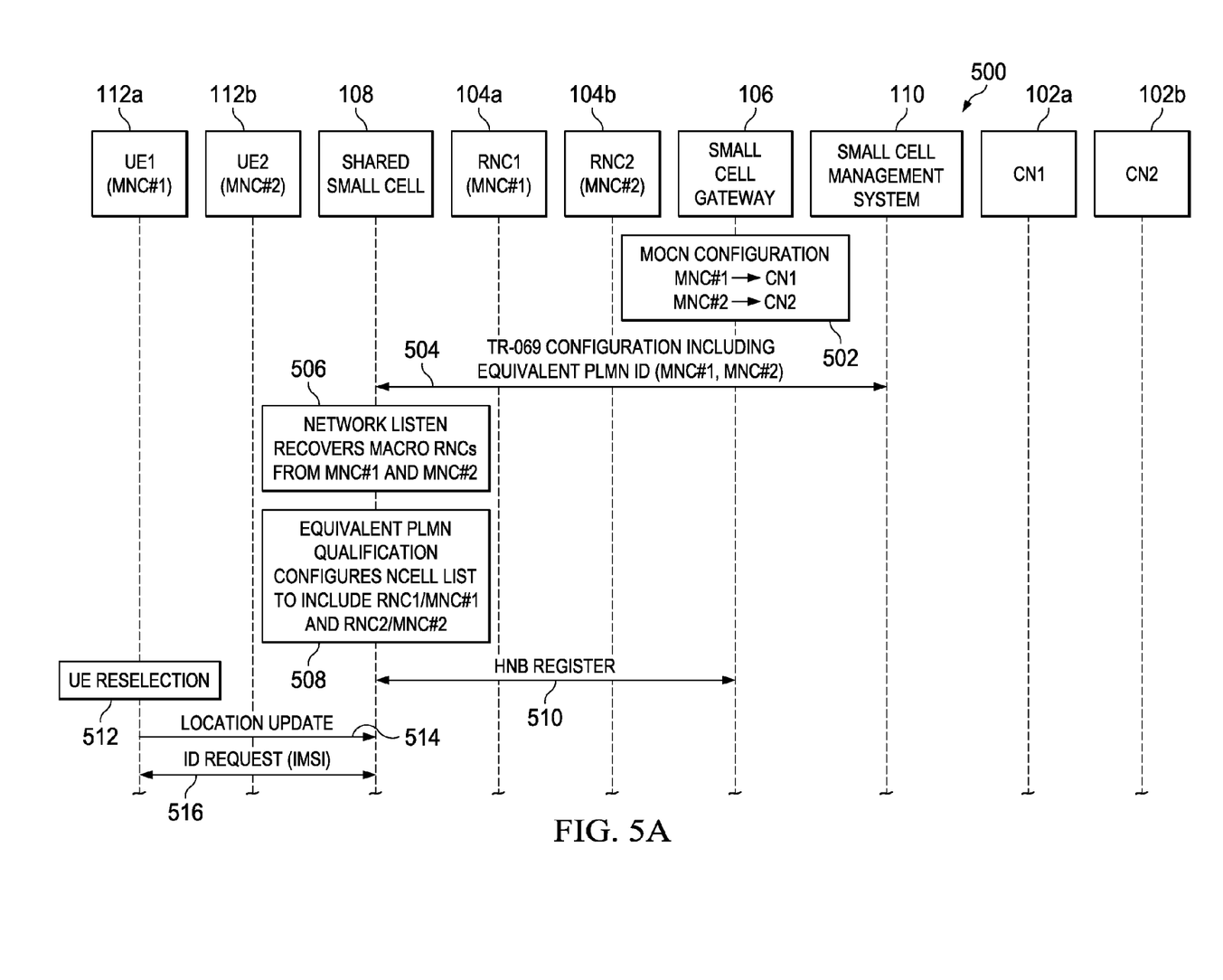
FIGS. 5A-5C are a simplified flow diagram depicting a flow associated with handling connected mode mobility from areas bounding multi-operator core network and non-multi-operator core network shared infrastructure according to one embodiment.
Figure 5B:
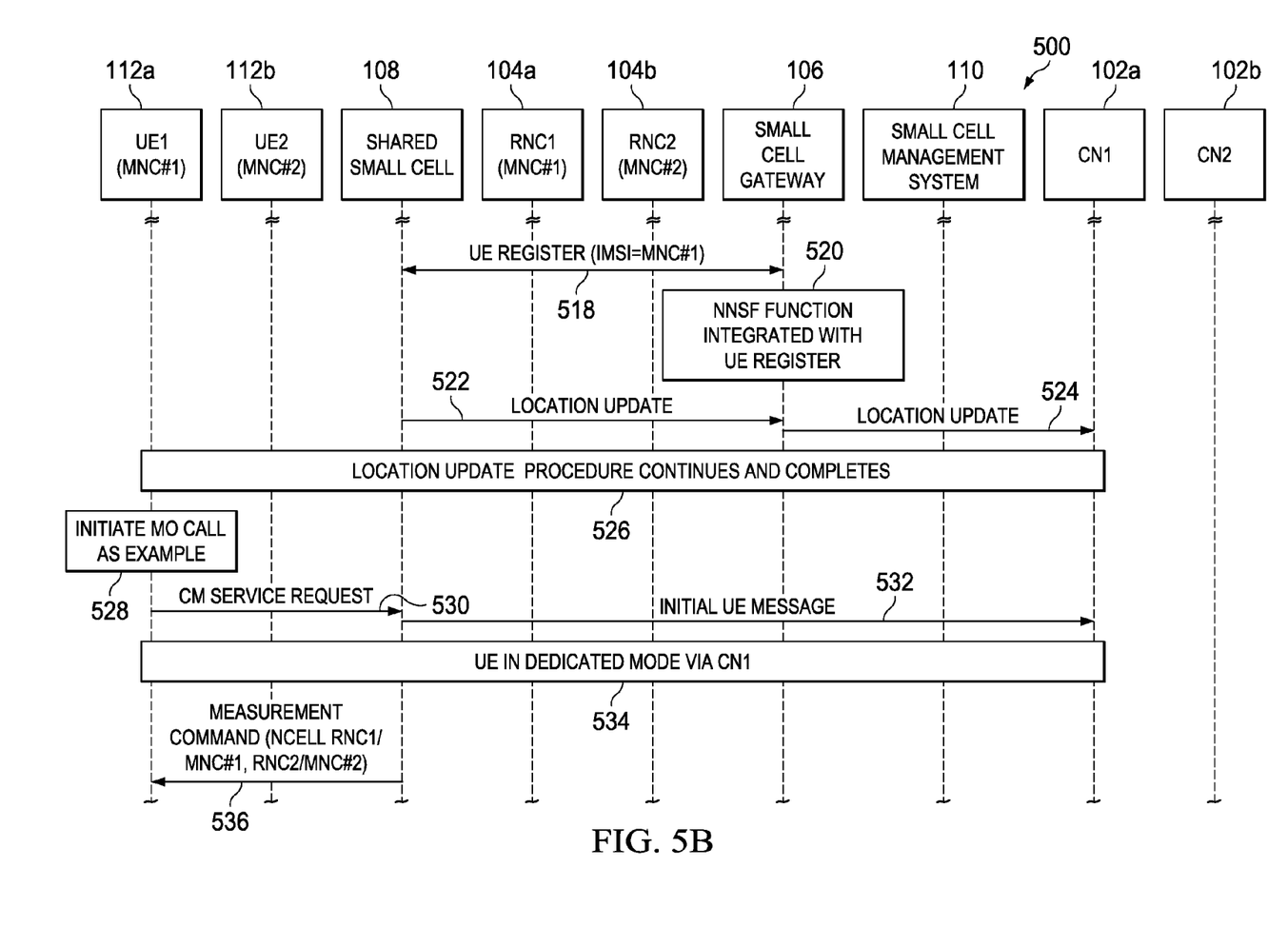
Figure 5C:
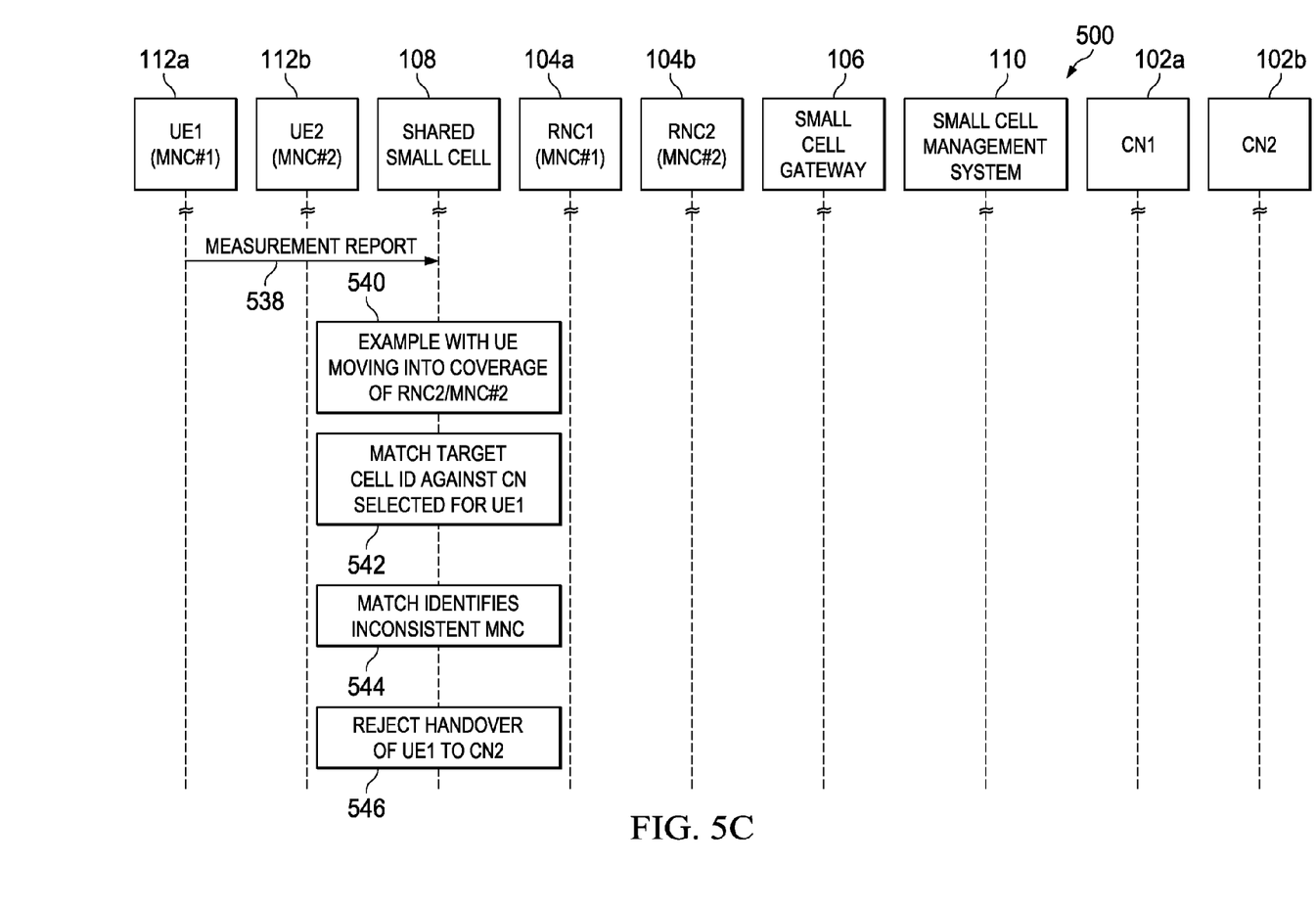

Referring now to FIGS. 5A-5C, FIGS. 5A-5C are a simplified flow diagram depicting a flow 500 associated with handling connected mode mobility from areas bounding multi-operator core network and non-multi-operator core network shared infrastructure according to one embodiment. In this particular flow 500, shared small cell 108 is configured to receive a UE registration message including core network information identifying the PLMN-IDs selected for a particular UE. Shared small cell 108 is further configured to reject a handover of a particular UE to a target core network if the PLMN-ID (or other network identifier) of the target core network is not part of a MOCN agreement with the core network associated with the particular UE.

In 502, small cell gateway 106 is provided with MOCN configuration information indicating that the PLMN-ID of MNC1 is associated with first core network 102a and the PLMN-ID of MNC2 is associated with second core network 102b. In 504, small cell management system 110 provides configuration information including an equivalent PLMN-ID of MNC1 and MNC2 to shared small cell 108. In a particular embodiment, the configuration information is provided from small cell management system 110 to shared small cell 108 using a BBF TR-069 protocol.

In 506, shared small cell 108 using a network listen recovers the macro RNCs identities of first RNC 104a and second RNC 104b corresponding to MNC1 and MNC2, respectively. In 508, the equivalent PLMN qualification configures the neighbor cell (NCELL) list to include first RNC 104a (MNC1) and second RNC 104b (MNC2). In 510, shared small cell 108 registers with small cell gateway 106. In 512, first UE (UE1) 112a initiates UE reselection to handover to shared small cell 108. In 514, first UE 112a sends a location update message to shared small cell 108. In 516, shared small cell 108 sends an ID request to first UE 112a and receives the IMSI associated with first UE 112a from first UE 112a.

In 518, shared small cell 108 initiates a UE registration procedure with small cell gateway 106 in which shared small cell 108 sends a UE registration request including the IMSI associated with first UE 112a to small cell gateway 106. The IMSI includes the PLMN-ID including the network identifier MNC1 of first core network 102a to which first UE 112a is associated. In 520, small cell gateway 106 performs a NNSF function integrated with the UE register. In 522, shared small cell 108 sends a location update message to shared small cell gateway 106. In 524, small cell gateway 106 sends a location update message to first core network 102a. In 526, the location update procedure continues and completes.

In 528, first UE 112a initiates a mobile call as an example operation. In 530, first UE 112a sends a CM service request message to shared small cell 108 to initiate the mobile call. In 532, shared small cell 108 sends an initial UE message to first core network 102a. In 534, first UE 112a is in the dedicated connected mode via first core network 102a. In 536, shared small cell 108 sends a measurement command to first UE 112a instructing first UE 112a to measure the signal quality and/or signal strength between first UE 112a and each of first RNC 104a having associated MNC1 and second RNC 104b having associated MNC2. In 538, first UE 112a sends a measurement report including the measurements associated with MNC1 and MNC2 to shared small cell 108. In 540, an example is illustrated in which the UE measurements indicate that the signal quality and/or signal strength between first UE 112a and a cell associated with second RNC 104b is greater than that between first UE 112a and shared small cell 108. As a result, a potential handover of first UE 112a moving into coverage of the second cell associated with second RNC 104b is triggered.

In 542, shared small cell 108 matches the target cell ID associated with second RNC 104b (MNC2) against the core network (first core network 102a) initially selected for (and associated with) first UE 112a. In 544, the match identifies an inconsistent MNC for first 112a since MNC2 is not associated with first UE due to there being no MOCN agreement between first core network 102a and second core network 102b. In 546, shared small cell 108 rejects the handover of first UE 112a to second RNC 104b of second core network 102b. As a result, first UE 112a remains in communication with shared small cell 108 and no handover is performed.

Figure 6A:
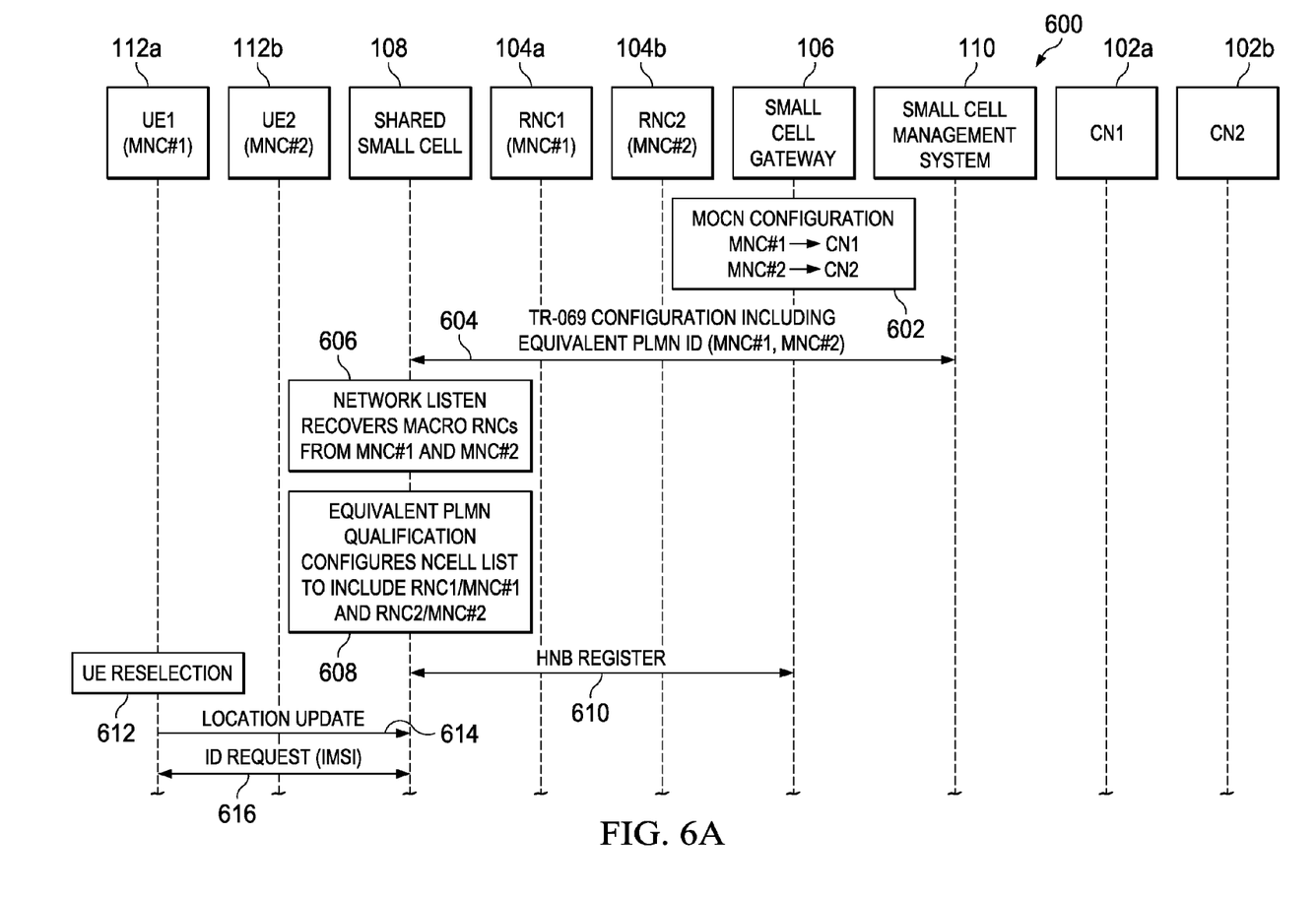
FIGS. 6A-6C are a simplified flow diagram depicting a flow 600 associated with handling connected mode mobility from areas bounding multi-operator core network and non-multi-operator core network shared infrastructure according to another embodiment.
Figure 6B:
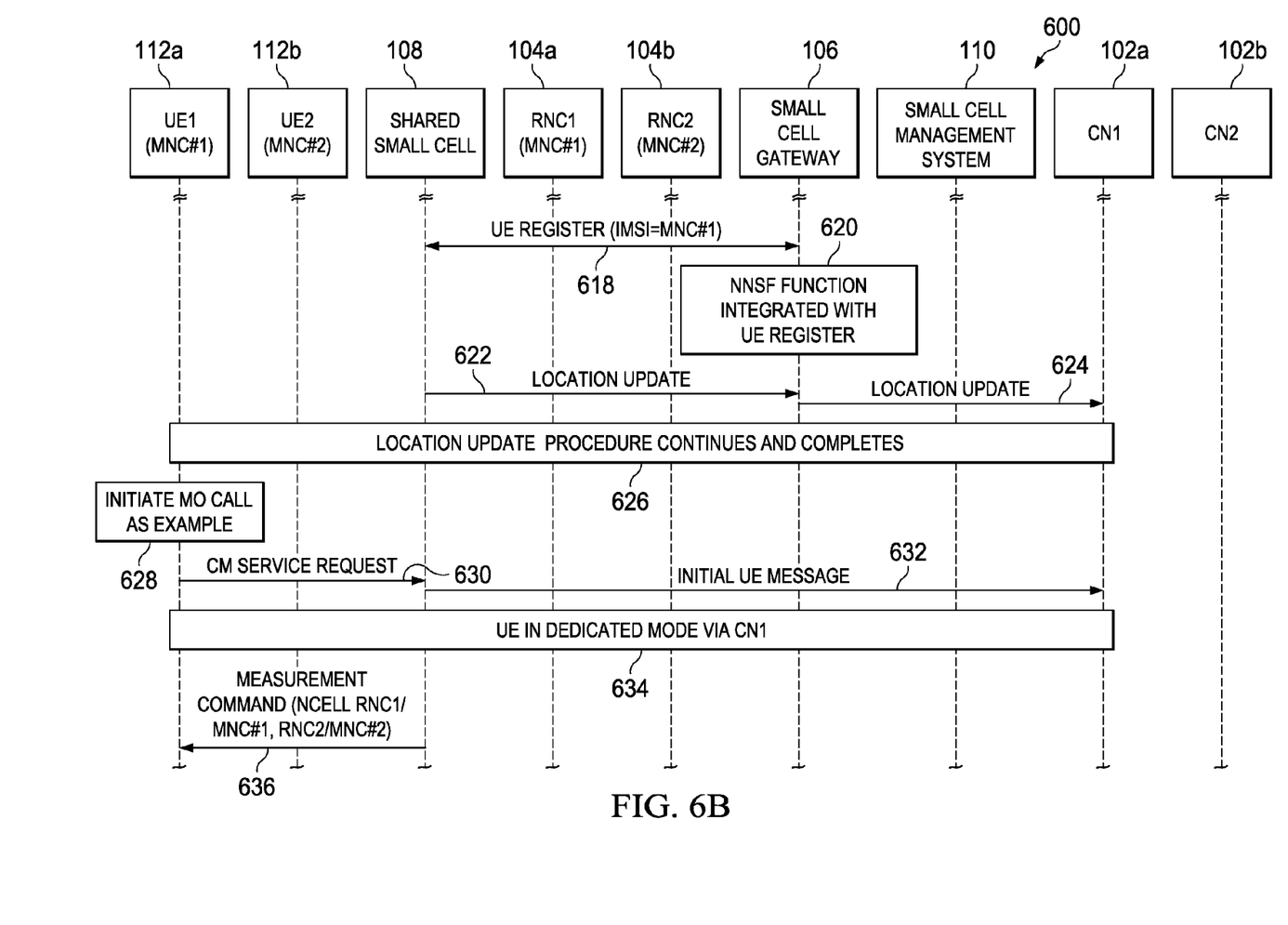
Figure 6C:
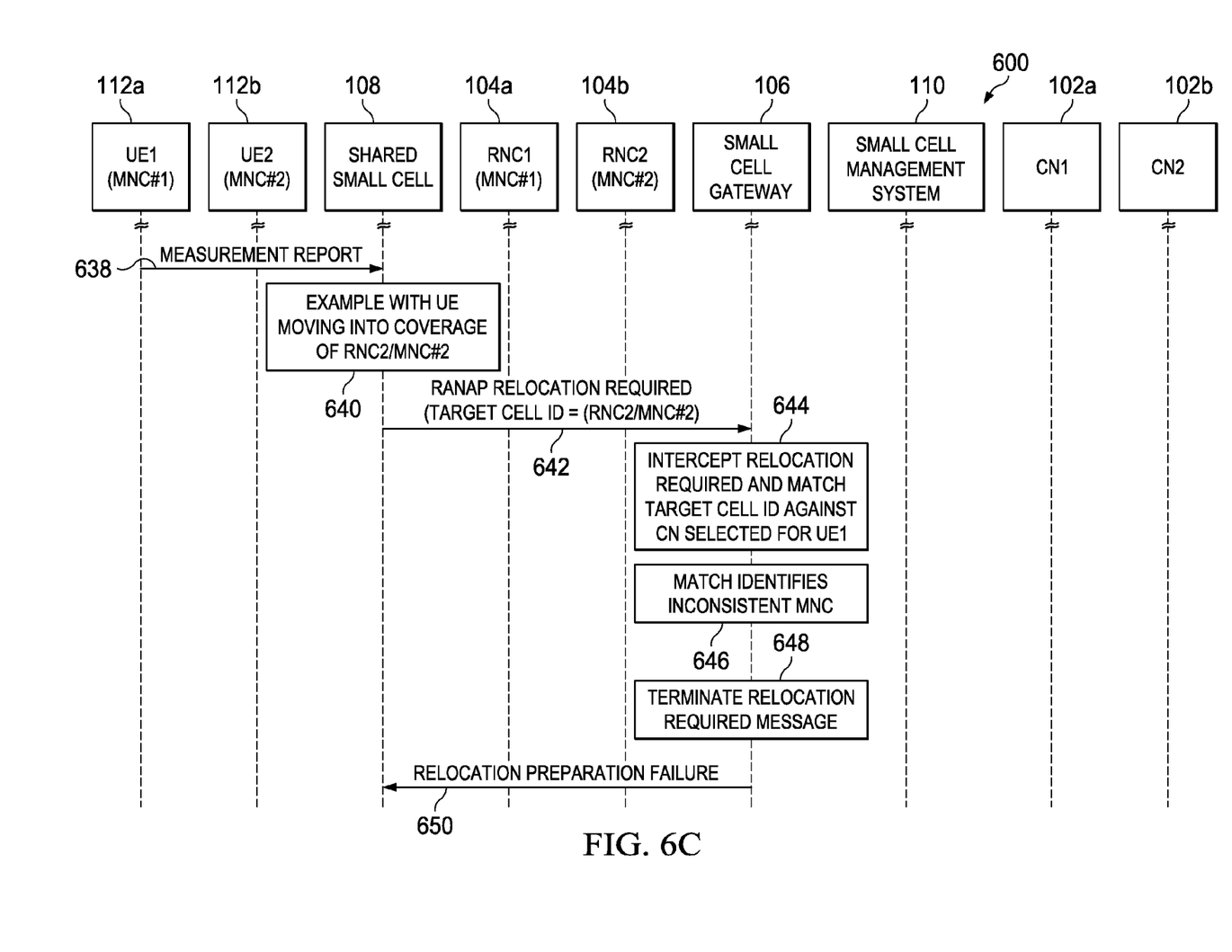

Referring now to FIGS. 6A-6C, FIGS. 6A-6C are a simplified flow diagram depicting a flow 600 associated with handling connected mode mobility from areas bounding multi-operator core network and non-multi-operator core network shared infrastructure according to another embodiment. In this particular flow 600, small cell gateway 106 is configured to parse relocation required messages (or similar handover message) associated with handover of a particular UE from the small cell to a target RNC, decode the target cell ID (e.g., PLMN-ID) and match the target cell ID with the configured cell ID of the RNC to which the particular UE is associated in the idle mode. If there is mismatch between the target cell ID and the cell ID associated with the particular UE, small cell gateway 106 is further configured to reject the relocation required message, e.g., by signaling a relocation preparation failure message to shared small cell 108.

In 602, small cell gateway 106 is provided with MOCN configuration information indicating that the PLMN-ID of MNC1 is associated with first core network 102a and the PLMN-ID of MNC2 is associated with second core network 102b. In 604, small cell management system 110 provides configuration information including an equivalent PLMN-ID of MNC1 and MNC2 to shared small cell 108. In a particular embodiment, the configuration information is provided from small cell management system 110 to shared small cell 108 using a BBF TR-069 protocol.

In 606, shared small cell 108 using a network listen recovers the identity of macro RNCs of first RNC 104a and second RNC 104b from MNC1 and MNC2, respectively. In 608, the equivalent PLMN qualification configures the neighbor cell (NCELL) list to include first RNC 104a (MNC1) and second RNC 104b (MNC2). In 610, shared small cell 108 registers with small cell gateway 106. In 612, first UE (UE1) 112a initiates UE reselection to handover to shared small cell 108. In 614, first UE 112a sends a location update message to shared small cell 108. In 616, shared small cell 108 sends an ID request to first UE 112a and receives the IMSI associated with first UE 112a from first UE 112a.

In 618, shared small cell 108 initiates a UE registration procedure with small cell gateway 106 in which shared small cell 108 sends a UE registration request including the IMSI associated with first UE 112a to small cell gateway 106. The IMSI includes the PLMN-ID including the network identifier MNC1 of first core network 102a to which first UE 112a is associated. In 620, small cell gateway 106 performs a NNSF function integrated with the UE register. In 622, shared small cell 108 sends a location update message to shared small cell gateway 106. In 624, small cell gateway 106 sends a location update message to first core network 102a. In 626, the location update procedure continues and completes.

In 628, first UE 112a initiates a mobile call as an example operation. In 630, first UE 112a sends a CM service request message to shared small cell 108 to initiate the mobile call. In 632, shared small cell 108 sends an initial UE message to first core network 102a. In 634, first UE 112a is in the dedicated connected mode via first core network 102a. In 636, shared small cell 108 sends a measurement command to first UE 112a instructing first UE 112a to measure the signal quality and/or signal strength between first UE 112a and each of first RNC 104a having associated MNC1 and second RNC 104b having associated MNC2. In 638, first UE 112a sends a measurement report including the measurements associated with MNC1 and MNC2 to shared small cell 108. In 640, an example is illustrated in which the UE measurements indicate that the signal quality and/or signal strength between first UE 112a and second RNC 104b is greater than that between first UE 112a and shared small cell 108. As a result, a potential handover of first UE 112*a* moving into coverage of second is triggered.

In 642, shared small cell 108 sends a RANAP relocation required message (or other handover message) including the target cell ID associated with second RNC 104*b* (MNC2) to small cell gateway 106. In 644, small cell gateway 106 intercepts the relocation required message, decodes the target cell ID (MNC2 associated with second RNC 104*b*) from the relocation required message and matches the target cell ID (MNC2) of the relocation required message against the PLMN-ID (MNC1) of first core network 102*a* initially selected for (and associated) with first UE 112*a*. In 646, the match identifies an inconsistent MNC for first 112*a* since MNC2 is not associated with first UE due to there being no MOCN agreement between first core network 102*a* and second core network 102*b*. In 648, small cell gateway 106 terminates the relocation required message. In 650, small cell gateway 106 sends a relocation preparation failure message (or other handover failure message) to shared small cell 108. As a result, first UE 112*a* remains in communication with shared small cell 108 and no handover is performed.

Figure 7:
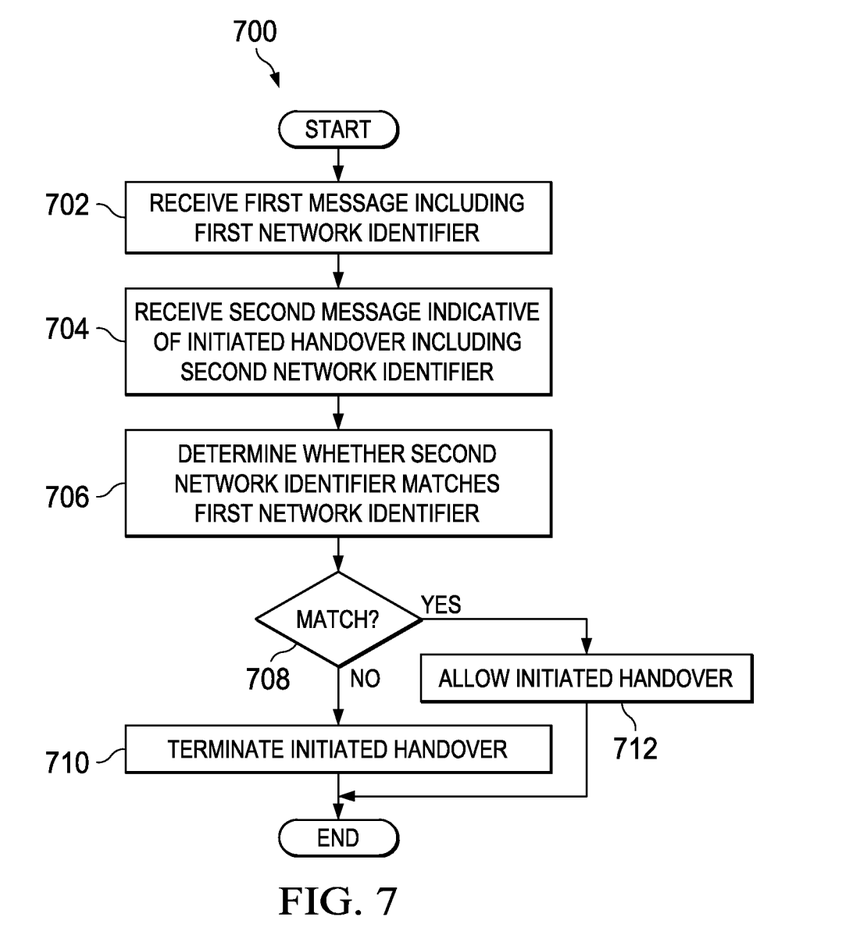
FIG. 7 is a simplified flowchart that illustrates example operations associated with handling connected mode mobility from areas bounding multi-operator core network and non-multi-operator core network shared infrastructure in accordance with one embodiment.

Referring now to FIG. 7, FIG. 7 is a simplified flowchart that illustrates example operations 700 associated with handling connected mode mobility from areas bounding multi-operator core network and non-multi-operator core network shared infrastructure in accordance with one embodiment. In 702, a first network element receives a first message including a first network identifier associated with a first network. The first message includes an indication of an association of the first network identifier with a first user equipment. In a particular embodiment, the first user equipment is first user equipment 112*a*. In a particular embodiment, the first network element includes a small cell access point such as shared small cell 108. In another particular embodiment, the first network element includes a small cell gateway such as small cell gateway 106. In a particular embodiment, the initiated handover is an initiated handover of the first user equipment from a third network to the second network. In a particular embodiment, the third network is a small cell network such as provided by shared small cell 108.

In 704, the first network element receives a second message indicative of an initiated handover of the first user equipment to a second network. The second message includes a second network identifier associated with the second network. In a particular embodiment, the second message is a measurement report from the first user equipment. In still other particular embodiments, the measurement report includes quality of service measurements or signal quality measurements between the first user equipment and one or more of the first network, the second network, and the third network. In another particular embodiment, the second message is a handover message, for example, a relocation request message.

In a particular embodiment, the first network is a first core network, e.g., first core network 102*a*, associated with a first network operator and the second network is a second core network, e.g., second core network 102*b*, associated with a second operator. In a particular embodiment, the first core network and the second core network have an existing agreement to share a small cell (e.g., shared small cell 108) but do not have an agreement to share their respective core network infrastructure such as RAN resources or services.

In 706, the first network element determines whether the second network identifier matches the first network identifier. In 708, if first network element determines that the second network identifier does not match the first network identifier, the operations continue to 710. In 710, the first network element terminates the initiated handover of the first user equipment to the second network and the operations end. In a particular embodiment, terminating the initial handover includes sending a handover failure message to a second network element. In a particular embodiment, the second network element is a small cell access point such as shared small cell 108. In 708, if first network element determines that the second network identifier matches the first network identifier, the operations continue to 712. In 712, the first network allows the initiated handover when the second network identifier matches the first network identifier and the operations end.

It should be understood that in various embodiments, the operations of FIG. 7 may be continuously repeated while first user equipment is within coverage of one or more networks. In further embodiments, the operations of FIG. 7 may be repeated when other user equipment associated with other core networks move into coverage of one or more networks.

In regards to the internal structure associated with communication system 100, each of small cell gateway 106, shared small cell 108, and shared small cell management system 110 can include memory elements for storing information to be used in achieving the operations, as outlined herein. Additionally, each of these devices may include a processor that can execute software or an algorithm to perform the activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to small cell gateway 106, shared small cell 108, and shared small cell management system 110 could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIGS. 2, 3, and 4] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIGS. 2, 3, and 4] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and further can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the previously described activities illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 100 may be applicable to other exchanges, routing protocols, or routed protocols. Moreover, although communication system 100 has been illustrated with reference to particular elements and operations that facilitate the communication process, these elements and operations may be replaced by any suitable architecture or process that achieves the intended functionality of communication system 100.

In a separate endeavor, communication system 100 may generally be configured or arranged to represent a 3G architecture applicable to UMTS environments in accordance with a particular embodiment. However, the 3G architecture is offered for purposes of example only and may alternatively be substituted with any suitable networking system or arrangement that provides a communicative platform for communication system 100. Moreover, the present disclosure is equally applicable to other cellular and/or wireless technology including CDMA, Wi-Fi, WiMAX, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving, at a first network element, a first message including a first network identifier associated with a first network, the first message further including an indication of an association of the first network identifier with a first user equipment;
   receiving, by the first network element, a second message indicative of an initiated handover of the first user equipment to a second network, the second message including a second network identifier associated with the second network, wherein the initiated handover is an initiated handover of the first user equipment from a small cell network in the first network element to the second network;
   determining, by the first network element, whether the second network identifier matches the first network identifier; and
   terminating the initiated handover by the first network element when the second network identifier does not match the first network identifier.

2. The method of claim 1, further comprising:
   allowing the initiated handover when the second network identifier matches the first network identifier.

3. The method of claim 1, wherein the second message is a measurement report from the first user equipment.

4. The method of claim 1 wherein the first network is a first core network associated with a first network operator and the second network is a second core network associated with a second operator.

5. The method of claim 1, wherein the first network element is a small cell gateway.

6. The method of claim 1, wherein the second message is a handover message.

7. The method of claim 6, wherein the handover message is a relocation request message.

8. The method of claim 1, wherein terminating the initial handover includes sending a handover failure message to a second network element.

9. The method of claim 8, wherein the second network element is a small cell access point.

10. Logic encoded in one or more non-transitory media that includes code for execution and when executed by a processor operable to perform operations comprising:
    receiving, at a first network element, a first message including a first network identifier associated with a first network, the first message further including an indication of an association of the first network identifier with a first user equipment;
    receiving, by the first network element, a second message indicative of an initiated handover of the first user equipment to a second network, the second message including a second network identifier associated with the second network, wherein the initiated handover is an initiated handover of the first user equipment from a small cell network in the first network element to the second network;

determining, by the first network element, whether the second network identifier matches the first network identifier; and terminating the initiated handover by the first network element when the second network identifier does not match the first network identifier.

11. The logic of claim 10, wherein the operations further comprise allowing the initiated handover when the second network identifier matches the first network identifier.

12. The logic of claim 10, wherein the second message is a measurement report from the first user equipment.

13. The logic of claim 10 wherein the first network is a first core network associated with a first network operator and the second network is a second core network associated with a second operator.

14. The logic of claim 10, wherein the first network element is a small cell gateway.

15. The logic of claim 10, wherein the second message is a handover message.

16. The logic of claim 10, wherein terminating the initial handover includes sending a handover failure message to a second network element.

17. A network element, comprising:
a memory element configured to store electronic code;
a processor operable to execute instructions associated with the electronic code; and
a module coupled to the memory element and the processor, wherein the network element is configured for:

receiving a first message including a first network identifier associated with a first network, the first message further including an indication of an association of the first network identifier with a first user equipment;

receiving a second message indicative of an initiated handover of the first user equipment to a second network, the second message including a second network identifier associated with the second network, wherein the initiated handover is an initiated handover of the first user equipment from a small cell network in the first network element to the second network;

determining whether the second network identifier matches the first network identifier; and terminating the initiated handover by the first network element when the second network identifier does not match the first network identifier.

18. The network element of claim 17, wherein the network element is further configured to allow the initiated handover when the second network identifier matches the first network identifier.

19. The network element of claim 17, wherein the second message is a measurement report from the first user equipment.

20. The network element of claim 17 wherein the first network is a first core network associated with a first network operator and the second network is a second core network associated with a second operator.

21. The network element of claim 17, wherein the network element is a small cell gateway.

22. The network element of claim 17, wherein the second message is a handover message.

* * * * *